United States Patent [19]
Johnstone et al.

[11] Patent Number: 4,472,783
[45] Date of Patent: Sep. 18, 1984

[54] FLEXIBLE MANUFACTURING SYSTEM

[75] Inventors: Richard Johnstone, Brookfield; Jody E. Kurtzhaltz, Milwaukee, both of Wis.

[73] Assignee: Kearney & Trecker Corporation, West Allis, Wis.

[21] Appl. No.: 401,243

[22] Filed: Jul. 23, 1982

Related U.S. Application Data

[63] Continuation of Ser. No. 170,820, Jul. 21, 1980, abandoned.

[51] Int. Cl.³ .................... G06F 15/46; G05B 19/417
[52] U.S. Cl. ..................................... 364/474; 29/568; 364/132; 364/468; 364/478
[58] Field of Search .............. 364/474, 475, 468, 478, 364/167-171, 188, 189, 131-134; 29/428-431, 568, 563, 564, 564.1, 33 P, 701, 703, 711, 771, 783, 791; 414/134, 135, 136

[56] References Cited

U.S. PATENT DOCUMENTS

| T995,065 | 6/1980 | Merkel et al. | 340/147 |
| 3,576,540 | 4/1971 | Fair et al. | 414/134 X |
| 3,668,653 | 6/1972 | Fair et al. | 364/200 |
| 3,720,814 | 3/1973 | Klein | 364/474 |
| 3,882,305 | 4/1975 | Johnstone | 364/474 |
| 3,909,922 | 10/1975 | Takasaki et al. | 29/563 |
| 4,029,950 | 6/1977 | Haga | 364/474 |
| 4,237,598 | 12/1980 | Williamson | 29/564 X |
| 4,281,379 | 7/1981 | Austin | 364/474 X |
| 4,288,849 | 9/1981 | Yoshida et al. | 364/474 X |

FOREIGN PATENT DOCUMENTS 1377966 12/1974 United Kingdom ................ 364/474

OTHER PUBLICATIONS

Gitto-"Direct Numerical Control Interfacing with CAD/CAM"-Astronautics & Aeronautics-Mar. 1980-vol. 18, No. 3-pp. 52-57.
Haas-"Flexible Manufacturing Systems"-Numerical Control Society, Proc. of Annual Meeting & Tech. Conf., Mar. 31-Apr. 3, 1974.
"Flexible Manufacturing System Fulfills Tractor Maker's Needs"-American Machinist, Jun. 15, 1975.
"Boosting Midvolume Productivity"-Production Magazine-Apr., 1978-pp. 65-69.
"Milwaukee-FMS"-Sales Literature Published by Kearney & Trecker Corp., Milwaukee, WI.

Primary Examiner—Joseph F. Ruggiero
Attorney, Agent, or Firm—Quarles & Brady

[57] ABSTRACT

An improved flexible manufacturing system comprises a plurality of computer numerically controlled machine tools, each controlled by a machine control system which is supplied with a plurality of sets of machine NC part programs and a program map from a supervisory control computer system. Each of the machine tools is located about the perimeter of a track which carries a plurality of pallet-carrying transporters, each moving under the control of a material handling system controller. The supervisory control computer system, coupled to the control system of each machine tool and to the material handling system controller, is provided with input data indicative of production requirements, material resources and system status, that is to say, the type of part carrying pallet carried by each transporter. In accordance with the input data supplied thereto, the supervisory control computer system supplies routing information to the material handling system controller which, in response, initiates movement of a transporter to a machine tool, shuttling of the part carrying pallet from the transporter to the machine tool, and execution of a selected one of the sets of machine NC part programs by the machine control system in accordance with the program map. During intervals, when the supervisory control computer system is inoperative, continued flexible manufacturing system operation can be maintained by operating the material handling system controller in semi-automatic or manual mode.

17 Claims, 9 Drawing Figures

FLEXIBLE MANUFACTURING SYSTEM

This application is a continuation of U.S. patent application Ser. No. 170,820 filed July 21, 1980.

This application refers to a microfiche index containing 65 cards of microfiche with each card having a maximum of 65 frames thereon for a total possible 4,225 frames.

BACKGROUND OF THE INVENTION

This invention relates to a manufacturing system capable of automatically performing a plurality of machining operations on each of a plurality of unfinished parts, and more specifically, to a control apparatus for regulating the operation of such a manufacturing system.

DESCRIPTION OF THE PRIOR ART

Until recently, mid-volume production of machined parts has only been possible by the use of a transfer line of dedicated machinery, or by use of a large number of conventional machine tools, each manned by a skilled operator. While the use of a transfer line to produce machined parts affords high volume part production, part flexibility, that is, the ability to produce parts of differing types or shapes, is usually not possible. In order to produce machined parts of a different type or shape, it is usually necessary to have a separate transfer line for each part type, thereby requiring a tremendous capital expenditure since each transfer line is very costly. Achieving midvolume production of machined parts by the use of a large number of conventional machines, although affording the advantage of part flexibility, incurs the disadvantage of high direct labor costs due to the necessity of having a skilled operator at each machine.

With the advent of flexible manufacturing systems, first developed in the early 1970's, mid-volume production of machined parts can now be accomplished without substantial direct labor costs while still allowing part flexibility. Typically, present day flexible manufacturing systems include a plurality of computer numerically controlled (CNC) machine tools situated about the perimeter of a track that carries a set of pallet carrying transporters propelled by a transporter drive mechanism about the track between the CNC machine tools and one or more load/unload stations where part carrying pallets are loaded onto or unloaded from each of the transporters. Each of the CNC machine tools, as well as the transporter drive mechanism, is under the control of a central computer which, in response to data entered thereto from one or more data entry terminals indicative of the type of part carrying pallet loaded onto each transporter at the load/unload stations, initiates movement of the transporter to a CNC machine tool. Once the part carrying pallet is moved to a machine tool and the part carrying pallet is shuttled from the cart to the machine tool, the central computer supplies the CNC machine tool with blocks of a machine part program in accordance with the type of part then at the CNC machine tool. Use of CNC machine tools to perform the desired machining operations reduces the number of machines required and, additionally, permits part flexibility since machining operations performed by each CNC machine tool can be varied by altering the machine part program supplied thereto from the central computer.

The major disadvantage of present day flexible manufacturing systems is their inability to sustain continued parts production in the event that the central computer is rendered inoperative due either to planned preventive maintenance or to central computer malfunction. Since the central computer supplies each CNC machine tool with the part program in blocks, once the central computer becomes inoperative there is no other source from which the machines can be supplied with part programs to allow continued machine tool operation. Thus, the CNC machine tools must be idled during such periods of central computer inoperation. Even if such periods of central computer inoperation are brief, a small interruption in parts production can be costly, particularly, if production of other parts or assemblies is dependent thereupon.

The transmission of machine NC part programs from the central computer to each CNC machine tool in blocks incurs the further disadvantage that it limits the number of machine tools that can be controlled by a single central computer if satisfactory machine tool performance is to be maintained. Regardless of the type of central computer employed, computer instruction execution cycle time is finite and memory space is limited so, therefore, only a given amount of information can be transferred from the central computer during each instruction execution cycle, thus limiting the number of machines that can be controlled thereby. To control additional CNC machine tools in excess of the total number controllable by a single central computer, additional processing hardware is required which greatly increases system cost and complexity.

It is an object of the present invention to provide a flexible manufacturing system which may be operated in a semi-automatic mode to maintain continued production of parts in the event of central computer failure.

It is another object of the present invention to provide a flexible manufacturing system which may be operated in a manual mode to maintain continued production of parts in the event of central computer failure.

It is yet another object of the present invention to provide a flexible manufacturing system capable of employing an unlimited number of machine tools.

BRIEF SUMMARY OF THE INVENTION

Briefly, in accordance with the preferred embodiment of the invention, an improved flexible manufacturing system for automated production of machined parts comprises a plurality of computer numerically controlled machining centers which are each provided with a plurality of sets of machine NC part programs and program maps by a supervisory control computer system. The supervisory control computer system also controls a material handling system controller which, in turn, controls a transport system that moves parts between one or more load/unload stations, where unfinished parts are entered and finished parts are discharged, and the computer numerically controlled machining centers. Located in proximity with each load/unload station is a data entry and display unit through which data, indicative of a then entered unfinished part, is transmitted to the supervisory control computer system. In response to data transmitted thereto from the data entry and display unit, the supervisory control computer system provides the material handling system controller with routing data which is translated by the material handling system controller into transportation system commands supplied to the transport system to initiate movement of parts to the computer numerically controlled machines and into machine tool commands supplied to the computer numerically controlled machining centers to initiate execution of a selected one of the sets of machine NC part programs in accordance with the program map. In the absence of routing data supplied thereto from the supervisory control computer system, the material handling system controller generates transportation system commands and machine tool commands in accordance with information entered manually by an operator. Each computer numerically controlled machining center is also responsive, in the absence of machine tool commands from the material handling system controller, to operator entered commands, and in response thereto, the computer numerically controlled machine tool executes a selected one of the set of machine NC part programs in accordance with the program map. In this manner, semi-automatic and manual operation, respectively, of the flexible manufacturing system can be sustained during intervals when the supervisory control computer system is inoperative.

DESCRIPTION OF THE DRAWINGS

FIGS. 1a and 1b are perspective views of a pair of computer numerically controlled machining centers, respectively, of the flexible manufacturing system of FIG. 1;

DETAILED DESCRIPTION OF THE PREFERRED EMBODIMENT

Figure 1:
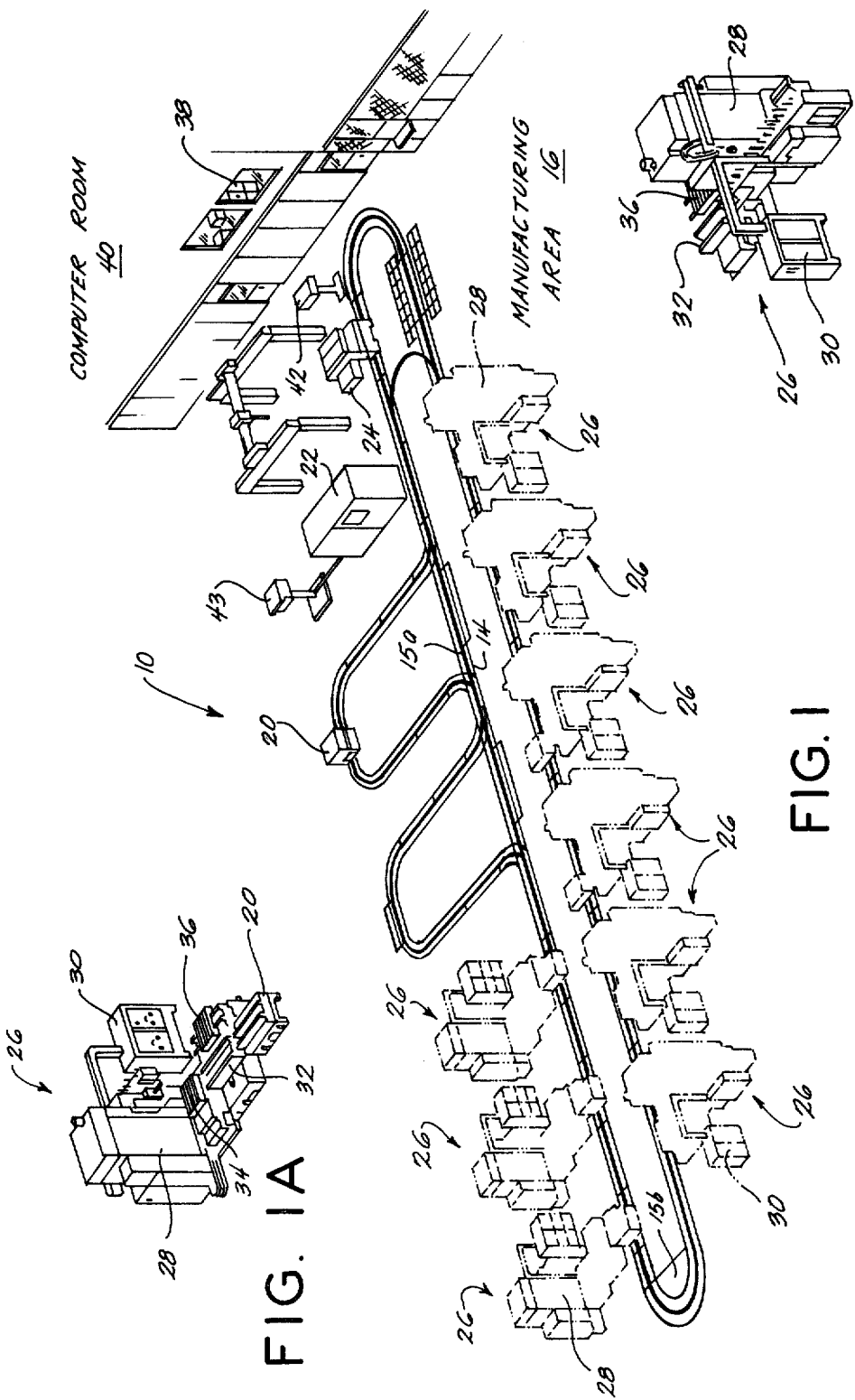
FIG. 1 is a perspective view of the preferred embodiment of the flexible manufacturing system of the present invention.

FIG. 1 illustrates a perspective view of a flexible manufacturing system 10 comprising a transport system which includes an endless track or loop 14 embedded within the floor of a manufacturing area 16. Within track 14 is a chain 15a which is driven by a chain drive mechanism 15b such as are well-known in the art. Each of a plurality of carts 20 are detachably connected to chain 15a by means of a drop pin carried by the cart, the drop pin on each cart being raised and lowered by means of ramps (not shown) disposed in the floor of the manufacturing area 16 about track 14. Each of the ramps is raised and lowered, to engage the drop pin on the cart when the cart passes over the ramp, by an associated solenoid (not shown). Chain drive mechanism 15b, which propels the chain in track 14, and each of the ramp solenoids which raise and lower a corresponding one of the ramps to decouple and couple, respectively, one of the carts to the chain, are controlled by a material handling system controller (MHSC) 22. In response to routing data provided thereto, MHSC 22 supplies electrical signals to the chain drive mechanism and to the ramp solenoids to initiate movement of carts 20 between one or more load/unload stations 24, where parts carrying pallets are loaded onto or off of each cart, and a plurality of computer numerically controlled (CNC) machining centers 26 situated about the perimeter of track 14.

Referring now to FIGS. 1a and 1b, each CNC machining center 26 comprises a numerically controlled (N/C) machine tool 28 which is coupled to and controlled by an associated machine control system 30 (further described hereinafter). Each of the CNC machining centers 26 also includes a shuttle assembly 32 situated between track 14 and machine tool 28 and controlled by MHSC 22 illustrated in FIG. 1. A plurality of trip switches (not shown) are disposed in track 14 and are each connected to MHSC 22. When a cart 20 arrives at a particular one of machining centers 26, as indicated by the actuation of a corresponding trip switch, MHSC 22 accordingly actuates shuttle assembly 32 at the CNC machining center through machine control system 30 to cause transfer of the part carrying pallet from cart 20 to the table 34 of N/C machine tool 28. As the part carrying pallet is transferred from cart 20 to table 34 by shuttle assembly 32, a pallet reader 36 mounted on shuttle assembly 32 "reads" the part carrying pallet, that is to say, pallet reader 36 reads the code on the pallet which is indicative of the type of part carried thereby. Data from the pallet reader 36, indicative of the part type, is transmitted to machine control system 30 which, in turn, transmits this data to MHSC 22. MHSC 22 then validates the pallet code to determine what part type is at the machine before transmitting commands to the machine control system.

MHSC 22 and each machine control system 30 are coupled to a supervisory control computer system (SCCS) 38 which serves as the central control for the flexible manufacturing system. SCCS 38 is located in a computer room 40 situated adjacent to and in line of sight with manufacturing area 16. Computer room 40 has a controlled environment to prevent against possible SCCS 38 malfunctions due to contamination and variations in temperature-humidity.

SCCS 38 is provided at the outset of flexible manufacturing system operation with production requirements and material resource information, as well as machine NC part programs, program maps and SCCS software. Selected sets of machine NC part programs are thereafter transmitted from SCCS 38 to each machine control system 30 of an associated one of CNC machining centers 26, illustrated in FIG. 1, for storage and later execution in response to machine tool commands from MHSC 22. In addition to supplying machine NC part programs to each machine control system, SCCS 38 also supplies each machine control system with a part program map which cross references the pallet number to a separate one of the machine NC part programs. These part program maps are dynamically updated at periodic intervals. As will become better understood hereinafter, transmission of whole sets of machine NC part programs and a part program map from SCCS 38 to each machine control system 30 at the outset of flexible manufacturing system operation permits continued flexible manufacturing system operation in the event SCCS 38 becomes inoperative.

During flexible manufacturing system operation, SCCS 38 processes production requirement information indicative of the rate of part production, material resource data indicative of the number and type of CNC machines and bank data, indicative of the quantity of raw materials available, and accordingly, determines which part type is to be loaded at one of the load/unload stations 24. Information indicative of the part type to be loaded at the load/unload station is then displayed on a data entry and display unit 42 situated adjacent to the load/unload station to advise that person (referred to as a "parts-handler") at the load/unload station to load the identified part type onto a cart then at the load/unload station. Thereafter, the parts-handler confirms the loading of the identified part by entering a confirm signal at data entry and display unit 42 which is then transmitted to SCCS 38. In response to the confirm signal, SCCS 38 generates routing data, indicative of desired path of the then loaded cart between the load/unload station to one or more of the CNC machining centers 26 and transmits such data to the MHSC 22. MHSC 22 then initiates movement of carts 20 to the selected one or more CNC machining centers 26 in accordance with the routing data generated by SCCS 38.

In the event that SCCS 38 becomes inoperative, as may occur when SCCS 38 is shut down or malfunctions, flexible manufacturing system operation can be sustained with MHSC 22 serving as the central controller. During intervals of SCCS 38 inoperation, MHSC 22 is operated in a semi-automatic mode to initiate the movement of carts 20 and the operation of machine shuttle assemblies 32 in accordance with routing information entered by an operator directly to MHSC 22 through controls on MHSC 22, or through a remote data entry and display unit 43 coupled to MHSC 22. MHSC 22 can also be operated manually to manipulate the movement of carts 20 and the operation of shuttle assemblies 32 in accordance with operator-entered commands.

Should MHSC 22 also become inoperative during the interval that SCCS is inoperative, each machine control system 30 associated with each CNC machining center 26 can be manually manipulated to execute one of the previously supplied sets of machine NC part programs corresponding to the pallet number read by the pallet reader in accordance with the program map. The ability to manually manipulate MHSC 22 and machine control system 30 in the event of SCCS 38 failure avoids the need for complete shutdown of the flexible manufacturing system which has heretofore been required in the event of inoperation of the central computer.

Figure 2:
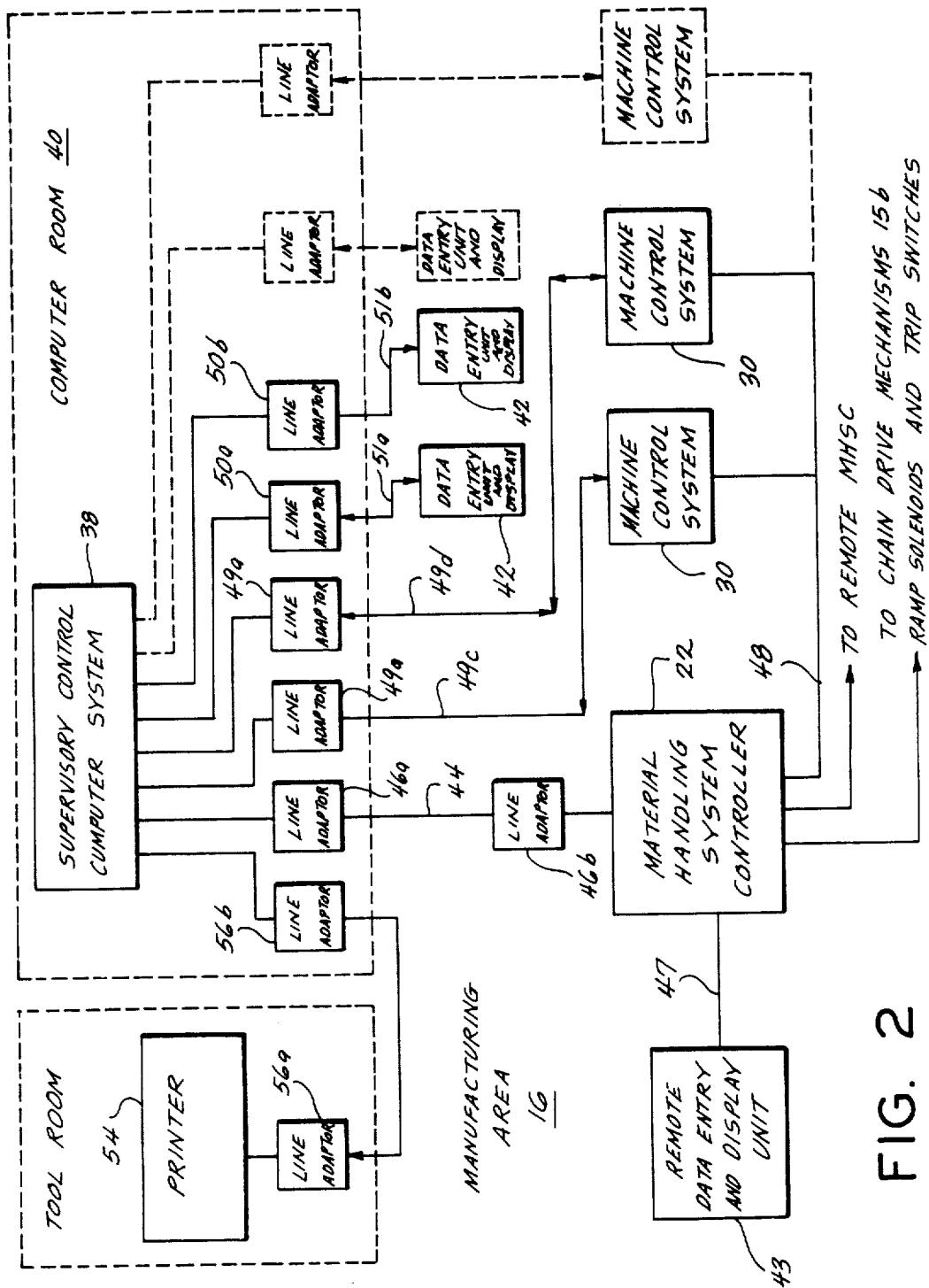
FIG. 2 is an electrical block diagram of the flexible manufacturing system of FIG. 1.

FIG. 2 illustrates the electrical block diagram of flexible manufacturing system 10 shown in FIG. 1. SCCS 38, located in computer room 40, is electrically linked through a high speed data bus 44 by a pair of line adapters 46a and 46b to MHSC 22 located in manufacturing area 16. Line adapters 46a and 46b are configured of identical circuits which each convert EIA RS-232 type signals into EIA RS-422 type signals and vice versa. Typically, MHSC 22 is subject to undesirable electrical interference due to its proximity to the electrical machinery located in manufacturing area 16. Since EIA RS-422 type signals are less susceptible to such electrical interference, it is more advantageous to transmit EIA RS-422 type signals across high speed data bus 44 between SCCS 38 and MHSC 22 rather than to transmit EIA RS-232 type signals which are normally produced by SCCS 38.

MHSC 22 is coupled via a bi-directional data bus 47 to remote data entry and display unit 43 thereby allowing information, such as operator entered routing data and operator entered shuttle and cart commands, to be transmitted to MHSC 22, and information concerning cart and shuttle status to be transmitted from MHSC 22 to remote data entry and display unit 43 for display to the operator. Each machine control system 30 of each CNC machining center is coupled to MHSC 22 by a low speed bi-directional data bus 48 to provide a completed path for the transmission of pallet reader data from each machine control system 30 to MHSC 22 and for the transmission of shuttle commands and machine tool commands to each machine control system 30 from MHSC 22 to initiate shuttling of a part carrying pallet from a cart then at the machining center to the machine table, and to initiate execution of a selected one of the machine part programs, respectively. MHSC 22 is further coupled to chain drive mechanism 15b, and to the trip switches and to the ramp solenoids in track 14 to control the movement of carts 20 about the track. MHSC 22 may also be connected to a remote MHSC should the transport system of the flexible manufacturing system be too large as to be controllable by a single MHSC.

SCCS 38 is coupled separately to each machine control system 30 through a high speed data bus and a line adapter. Thus, each of the pair of machine control systems 30 illustrated in FIG. 2 is separately coupled to SCCS 38 through a separate one of line adapters 49a and 49b, respectively, and high speed data buses 49c and 49d, respectively, line adapters 49a and 49b each being configured identically to line adapters 46a and 46b. Each high speed data bus and line adapter carries sets of machine NC part programs and part program maps from SCCS 38 to each machine control system 30 and carries information from each machine control system indicative of machine tool parameters, such as cutting tool use, machine cycle time, and machine usage, to name a few, back to SCCS 38. SCCS 38 is capable of controlling a large number of CNC machining centers, provided that each additional machine control system, as indicated by dashed lines, is coupled to SCCS 38 through a separate high speed data bus and line adapter, both illustrated by dashed lines. Each data entry and display unit 42 is separately coupled to SCCS 38 through a line adapter and a high speed data bus, and thus, each of the pair of data entry units 42, illustrated in FIG. 2, is coupled through a separate one of line adapters 50a and 50b, respectively, and a separate one of data buses 51a and 51b, respectively, to the SCCS. Additional data entry units, as indicated by dashed lines, may each be separately coupled to SCCS 38 by the addition of line adapter and high speed data bus, both illustrated by dashed lines.

To provide a visual display of cutting tool usage, a printer 54, typically situated in the tool room or such other location where cutting tools for each CNC machining center are stored, is coupled to SCCS 38 through a data bus 55 and a pair of line adapters 56a and 56b, each line adapter being configured identically to line adapters 46a and 46b. By displaying the cumulative cutting tool usage in excess of a predetermined limit, printer 54 apprises maintenance personnel of the need to replace worn cutting tools.

Figure 3:
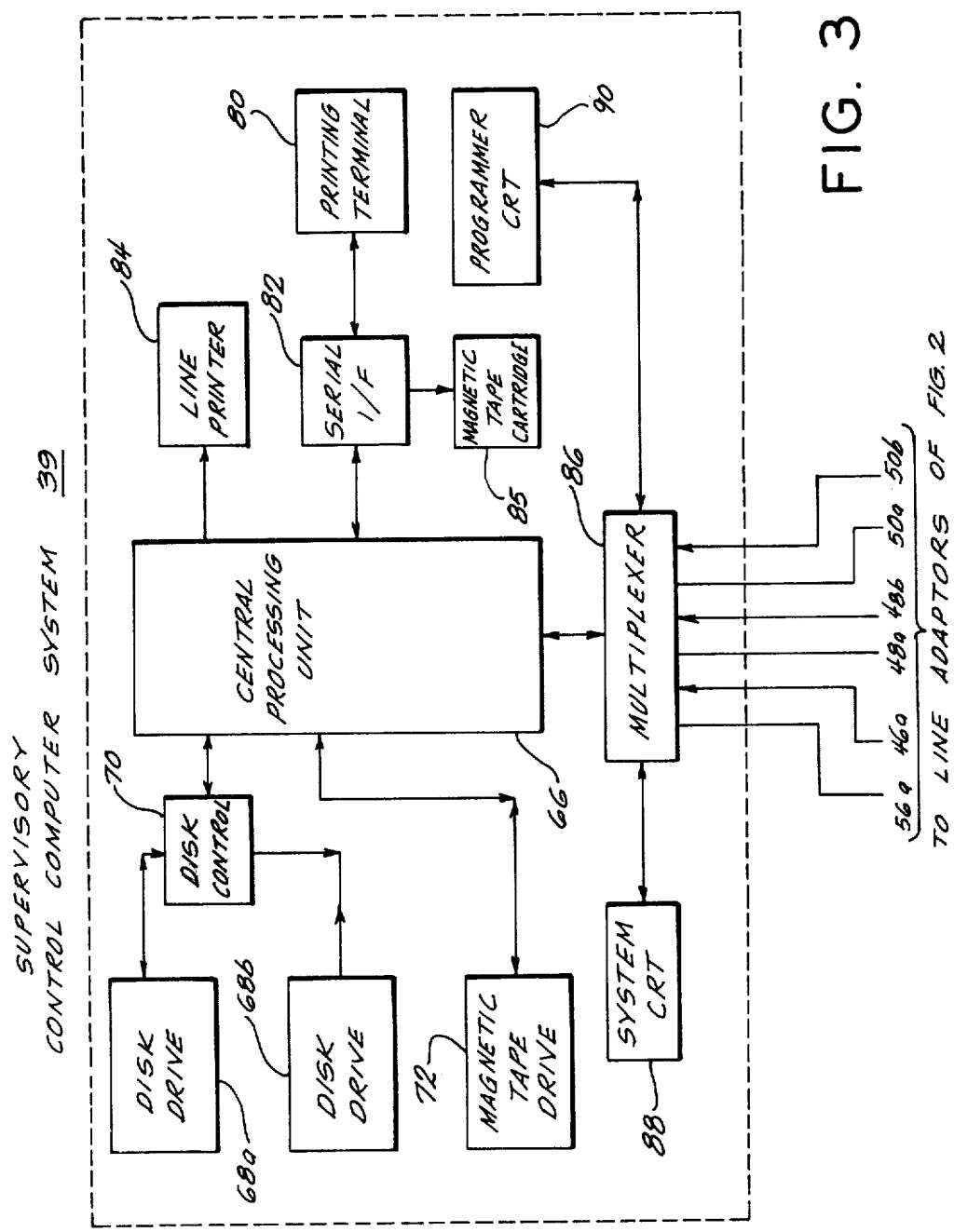
FIG. 3 is an electrical block diagram of the supervisory control computer system which comprises a portion of the flexible manufacturing system of FIG. 1.

Referring to FIG. 3, there is shown a block diagram of SCCS 38. In the presently preferred embodiment, SCCS 38 comprises a central processing unit (CPU) 66, typically configured of a Model PDP 11/44 or a Model PDP 11/60 processor as manufactured by Digital Equipment Corporation, Maynard, Mass. A pair of magnetic disk drives 68a and 68b, each typically configured of a Digital Equipment Corporation Model RK 07 disk drive, are coupled to CPU 66 through a disk controller 70, typically configured of a Digital Equipment Corporation Model RK 711 disk controller. Magnetic disk drives 68a and 68b serve as the primary means for storing SCCS software (described hereinafter with respect to FIG. 6), which is executed by CPU 66 during flexible manufacturing system operation. A magnetic tape drive 72, typically configured of a Model TS 11 magnetic tape system, as manufactured by Digital Equipment Corporation, is coupled to CPU 66, and in the event of an electrical or mechanical failure of disk memories 68a and 68b, magnetic tape unit 72 then serves as the primary means for storing SCCS software. Input data encoded on magnetic tape can also be inputted to CPU 66 from tape drive 72.

A printing terminal 80, typically configured of a Digital Equipment Model LA 120 terminal, is coupled through a serial interface 82 to CPU 66 to permit operator communication with CPU 66. A high speed line printer 84, typically configured of a Digital Equipment Model LP 11 line printer, is coupled to CPU 66 and provides a quick permanent paper record of CPU 66 data transmitted thereto. If desired, a magnetic tape cartridge unit 85, typically configured of a Digital Equipment Corporation Model TU 58 tape cartridge unit, can be connected to serial interface 82 to allow input of pre-existing machine NC part programs to CPU 66 for transmission to CNC machining center 26 illustrated in FIG. 1.

A digital multiplexer 86, typically configured of a pair of Digital Equipment Model DZ 11E multiplexers, couples CPU 66 to line adapters 46a, 48a, 50a, 50b and 56b, all illustrated in FIG. 2, and to a pair of cathode ray tube (CRT) terminals 88 and 90. CRT 88 terminal is designated as the system CRT, and it is through this terminal that information is entered to CPU 66, such as production data, resource data, bank data and path data, the path data being indicative of all the different possible or logical paths between the CNC machining centers and the load/unload stations, rather than the actual or physical paths. System CRT 88 also serves to display diagnostic and status information, as well as periodic reports concerning machine cycle time and tool use. CRT terminal 90 is designated as the programmer cathode ray tube terminal, and it is through this terminal, as well as magnetic tape unit 72, that SCCS software is entered into CPU 66. The SCCS software consists of three major programs, the system manager interface (SMI), the scheduler (SCHED), and the ROUTER, which are each described in greater detail with respect to FIG. 6. In addition, part program files, as well as operator instructions, may also be entered into CPU 66 through programmer CRT 90.

Figure 4:
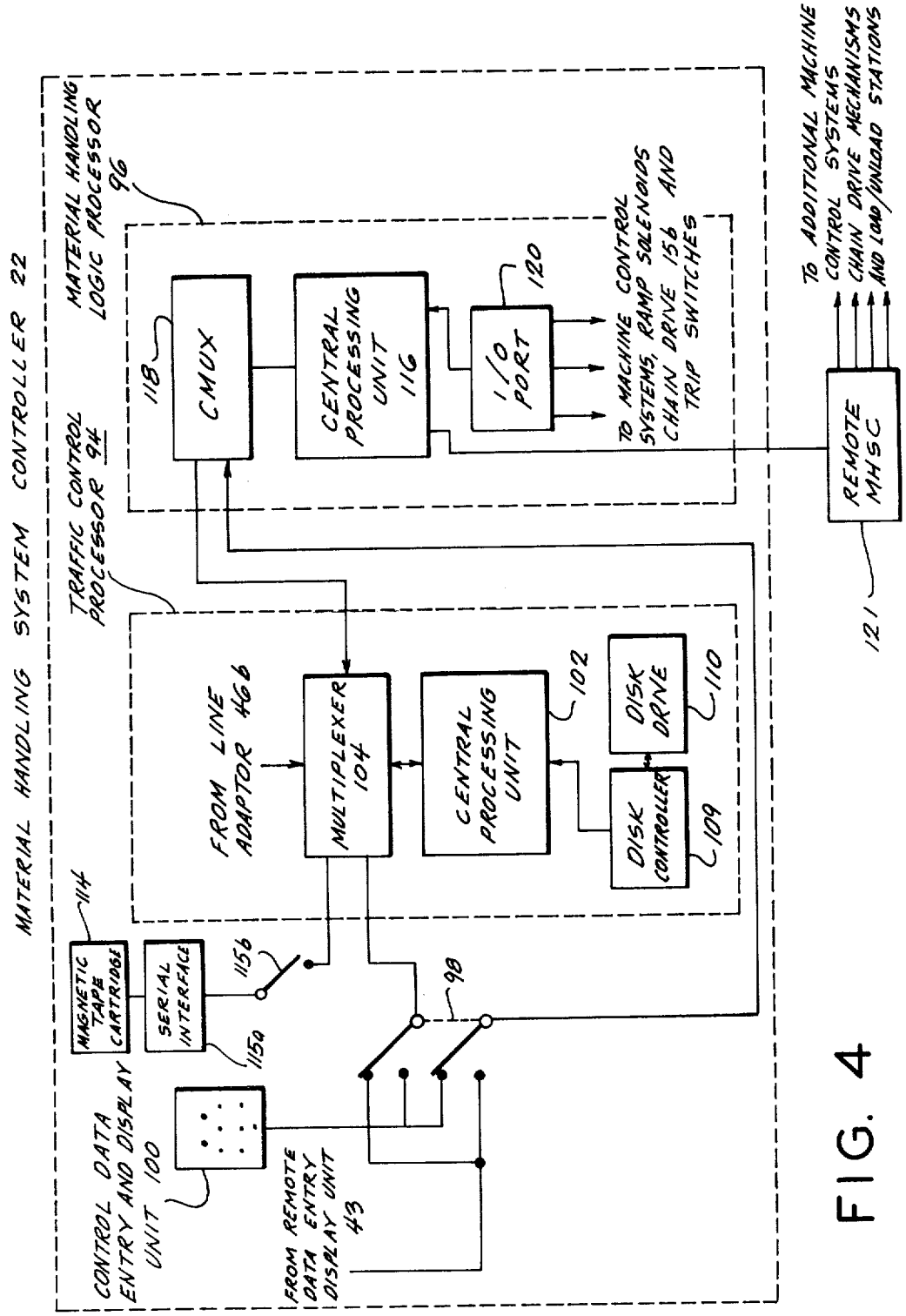
FIG. 4 is an electrical block diagram of the material handling system controller which comprises a portion of the flexible manufacturing system of FIG. 1.

The details of MHSC 22 are illustrated in FIG. 4. MHSC 22 comprises two processors, a traffic control processor (TCP) 94 and a material handling logic processor (MHLP) 96. TCP 94 serves as the link between SCCS 38 (illustrated in FIG. 2) and MHLP 96 and translates routing information produced by SCCS 38 into cart and shuttle commands which are transmitted to MHLP 96. MHLP 96 then translates the cart and shuttle commands supplied thereto from TCP 94 into electrical signals which are transmitted to chain drive mechanism 15b, the ramp solenoids, and to the control apparatus 30 of each CNC machining center 26, to initiate movement of carts 20 about track 14, illustrated in FIG. 1, and shuttling of a part carrying pallet from a cart to the table of an N/C machine. A double pole, double throw switch 98 couples TCP 94 between a control data entry and display unit 100 mounted on the front panel of the material handling system enclosure and remote data entry and display unit 43, illustrated in FIG. 2, and couples MHLP 96 between remote data entry and display unit 43 and control data entry and display unit 100, respectively. Should SCCS 38 become inoperative, thereby ceasing to transmit routing data to MHSC 22, then semi-automatic flexible manufacturing system operation can readily be facilitated by MHSC 22 in accordance with operator generated routing data entered through either control data entry and display unit 100 or remote data entry and display unit 43 to TCP 94. If desired, the flexible manufacturing system can be operated manually in accordance with operator generated cart and shuttle commands entered to MHLP 96 through either remote data entry and display unit 43 or control data entry and display unit 100.

In the presently preferred embodiment, TCP 94 comprises a central processing unit (CPU) 102, typically configured of a Digital Equipment Model LSI 11/23 processor. A multiplexer 104 couples CPU 102 to line adaptor 46b (FIG. 2), as well as to switch 98 and MHLP 96. Typically, multiplexer 104 is configured of a Digital Equipment Model MBX 11C multiplexer and serves to couple CPU 102 to SCCS 38.

Coupled to CPU 102 is a disk controller 109, which is typically configured of a Model DZ 201 controller, such as is manufactured by Dialog Corporation. In accordance with commands from CPU 102, disk controller 109 controls a magnetic disk drive 110, typically configured of a Model 4004 disk drive, as manufactured by Shugart Corporation. Disk drive 110 contains not only the software for CPU 102, but also serves as a dynamic CPU memory, retaining information concerning the location and status of each of carts 20 illustrated in FIG. 1a.

Figure 7:
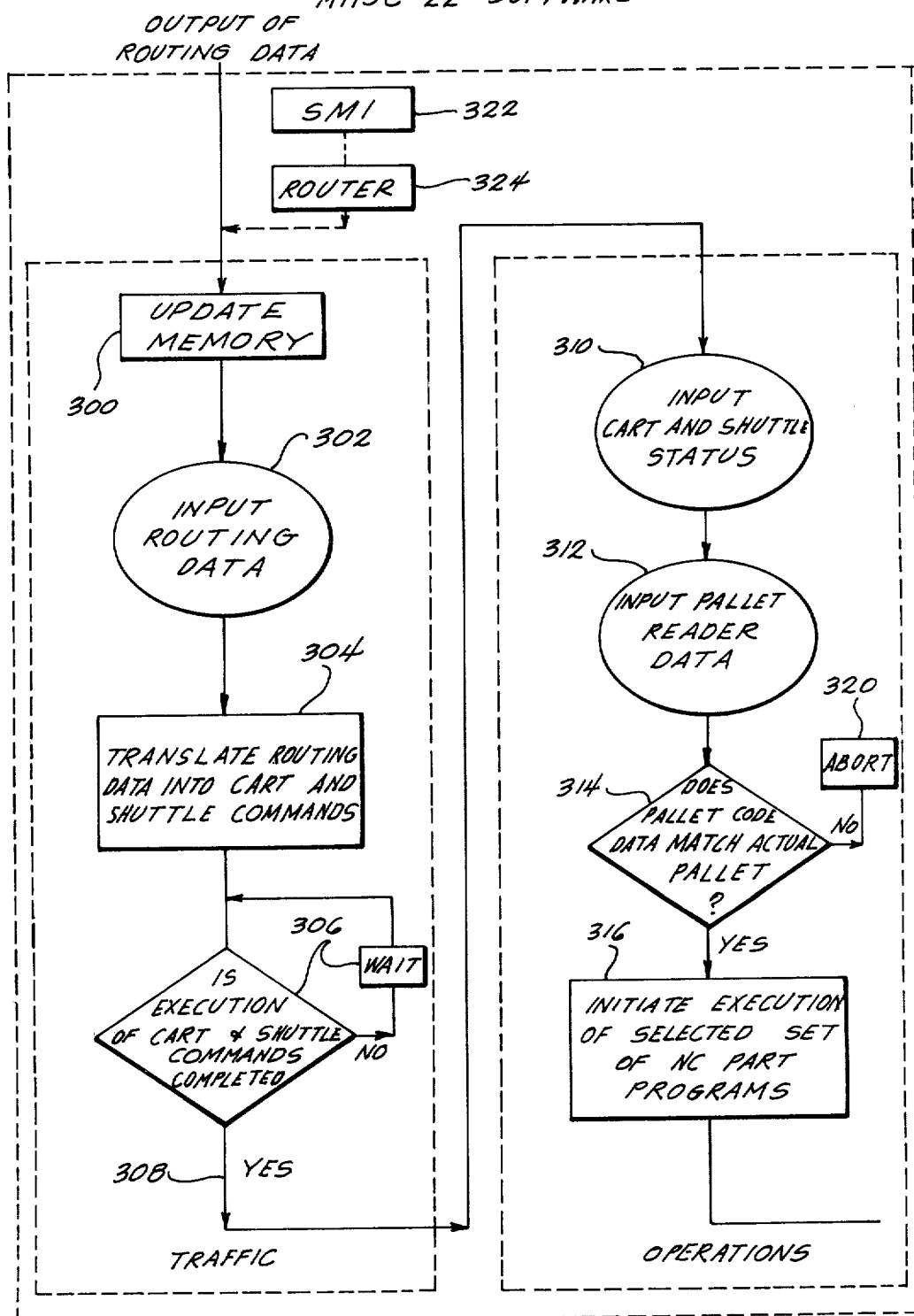
FIG. 7 is a flow chart diagram of a portion of the software executed by the material handling control system of FIG. 4.

The software for CPU 102 is stored on the magnetic surfaces of disk drive 110 and includes a TRAFFIC program and an OPERATIONS program which are each described in flow chart form with respect to FIG. 7. During execution of the TRAFFIC program by CPU 102, routing data produced by SCCS 38, illustrated in FIG. 1, is translated into cart and shuttle commands which are then supplied to MHLP 96 which translates them into electrical signals which control the operation of the chain drive mechanism and the ramp solenoids, as well as the shuttle assemblies on each CNC machining center. During execution of the OPERATIONS program, CPU determines whether a specific part program is to be executed by the machine control system, and accordingly, commands MHLP 96 to supply machine tool commands to each machine control system to cause execution of a selected one of the part programs stored thereat in accordance with the program map.

In addition to the TRAFFIC and OPERATIONS programs, disk drive 110 also contains a pair of programs, described hereinafter, which are executed by CPU 102 during intervals when SCCS 38 is inoperative. The first of the pair of programs ascertains whether or not operator commands entered through remote data entry and display unit 43, illustrated in FIG. 2, or control data entry and display unit 100 are, in fact, valid commands. The second of the pair of programs translates those valid commands, as determined by the first programs, into routing information which is then translated by the TRAFFIC program into cart and shuttle commands. Should it become necessary to supplement the software stored on disk drive 110, additional software can readily be entered to CPU 102 through magnetic tape cartridge 114 configured identically to tape cartridge 85 of FIG. 3, which is coupled through a serial interface 115a and a switch 115b to multiplexer 104.

MHLP 96 comprises a ladder logic central processing unit (CPU) 116 which is typically configured of the combination of a Kearney & Trecker Model 1-20636 CPU, Model 1-20604 CPU control, Model 1-2061806 memory, and a Model 1-20615001 peripheral interface. Configuring CPU 116 of a ladder logic processor, such as the type manufactured by Kearney & Trecker Corporation, is advantageous as such a processor permits ready display in ladder logic fashion of transport system conditions, thereby permitting ease of servicing. CPU 116 is coupled both to multiplexer 104 of TCP 94 and control data entry and display unit 100 through a communications multiplexer (CMUX) 118 which is typically configured of a Kearney & Trecker Model 1-2060101 multiplexer. In accordance with shuttle and cart commands supplied by CPU 102 or operator generated cart and shuttle commands entered through remote data entry and display unit 43, illustrated in FIG. 2, or control data entry and display unit 100, CPU 116 produces a set of electrical signals which are supplied through an I/O port 120, typically configured as the combination of a Kearney & Trecker Model 1-2064000 I/O interface board and a Model 1-2065200 driver board, to each machine control system 30, as well as to chain drive mechanism 15b and to the ramp solenoids in track 14 to initiate movement of carts 20 about track 14, both illustrated in FIG. 1, and to initiate operation of the shuttle assembly on each machine to transfer a part carrying pallet from a cart then at the machine tool to the machine tool table. Where the flexible manufacturing system is to include a large number of CNC machining centers, and a large number of carts and load/unload stations that is in excess of the number that can be conventionally controlled by I/O port 120, it may be necessary to add a remote MHSC 121, typically configured of a bus extender, such as manufactured by Kearney & Trecker Corporation, to couple each machine control system of each additional CNC machining center, as well as each additional load/unload station, ramp solenoid and chain drive mechanism to CPU 116.

Figure 5:
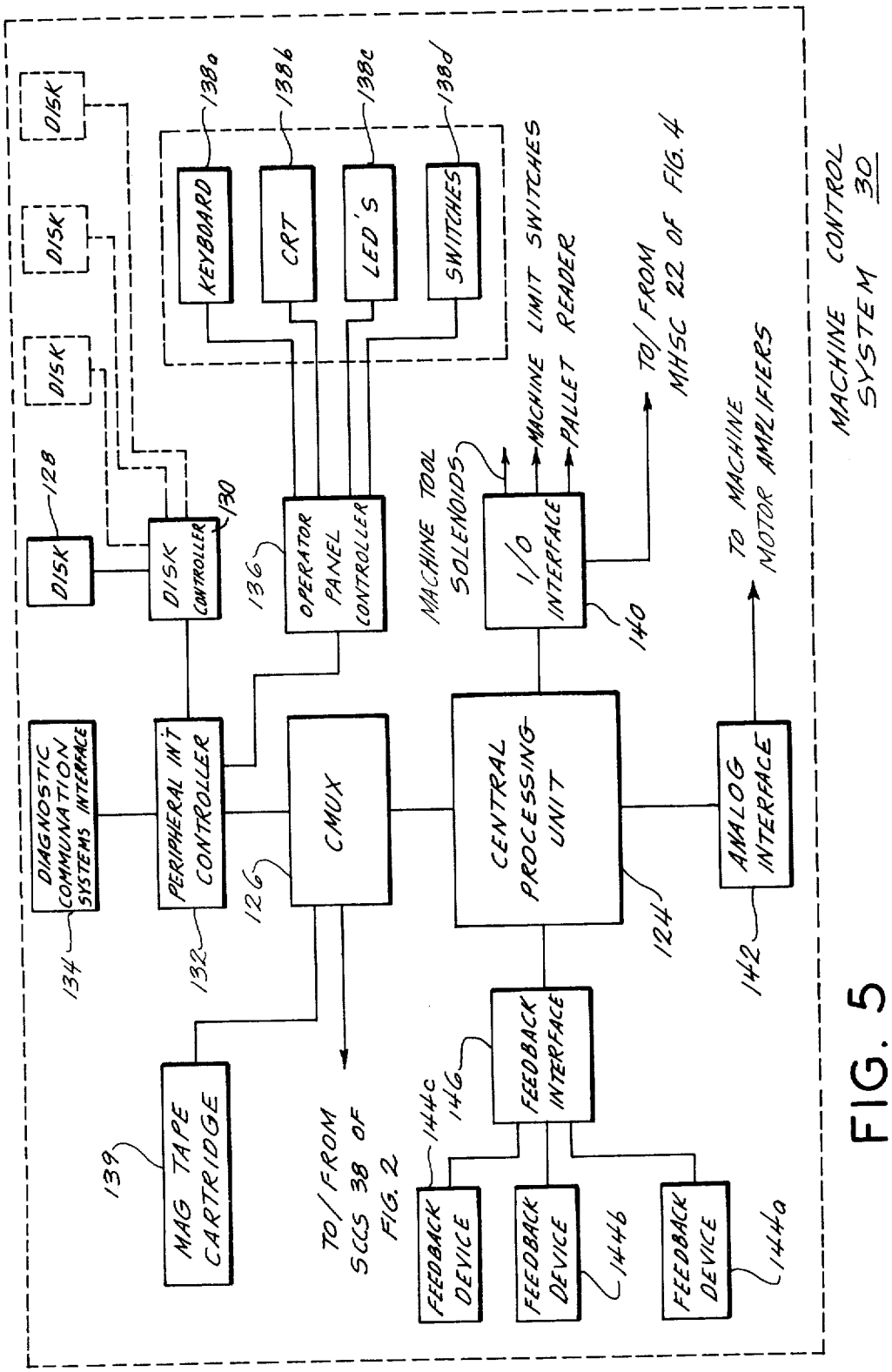
FIG. 5 is an electrical block diagram of the machine control system of one of the machines illustrated in FIGS. 1a and 1b.

FIG. 5 illustrates the details of machine control system 30. In the presently preferred embodiment, machine control system 30 comprises a Kearney & Trecker Model D17 control system which includes a central processing unit (CPU) 124, typically configured substantially identical to CPU 116, illustrated in FIG. 4. CPU 124 is coupled through a communication multiplexer (CMUX) 126, configured identically to CMUX 118, illustrated in FIG. 4, to SCCS 38, illustrated in FIG. 2. The machine NC part programs and program map transmitted by SCCS 38 to machine control system 30 are stored on a magnetic disk 128 controlled by a disk controller 130, such as Kearney & Trecker Model 1-2066880 disk controller, which is further controlled by a peripheral interface controller 132 coupled to CMUX 126. Typically, peripheral interface controller 132 comprises an eight bit microprocessor, such as Motorola Model M6800 microprocessor, which is programmed to control disk controller 130, which in addition to controlling disk 128 can control up to three additional disk drives, each illustrated by dashed lines. In addition, peripheral interface controller 132 couples CMUX 126 to a diagnostic control system interface 134 to allow CPU 124 to interface with a remote diagnostic communication system, such as the type described in U.S. Pat. No. 3,882,305 issued to Richard Johnstone and assigned to the assignee of the present invention. CMUX 126 also couples CPU 124 to an operator panel controller 136 which is controlled by peripheral interface controller 132. Operator panel controller 136 controls a keyboard 138a, a CRT 138b, LED indicators 138c and switches 138d, all located on the front surface of the machine control system enclosure. It is through CRT 138b and LED indicators 138c that information is displayed to the machine operator, while keyboard 138a and switches 138d serve to transmit operator commands to CPU 124 to regulate machine operation during intervals when both SCCS 38 and MHSC 22, illustrated in FIG. 2, are inoperative. It may be desirable to couple a magnetic tape cartridge unit 139 to CMUX 126. This permits transmission of NC part programs and program maps stored on mylar tape to CPU 124.

During normal operation, CPU 124 is supplied from MHSC 22 via an I/O interface 140, configured identically to I/O interface 120 in FIG. 4, with information indicating the arrival of a part at the machine. CPU 124 first causes shuttling of the part to the machine table then employs the part program map to select a set of NC part programs in accordance with the pallet code, as determined from pallet reader data. CPU 124 then advises MHSC 22 of its intention to execute the selected set of machine NC part programs. If the pallet code read by the pallet reader corresponds with the code of the actual pallet on the machine table, as determined by MHSC 22 from routing data provided thereto from SCCS 38, then MHSC 22 supplies CPU 124, via I/O interface 136, with a confirm signal causing CPU 124 to execute the selected set of machine NC part programs. If the pallet actually on the machine differs from the pallet CPU 124 computed to be on the machine, then MHSC 22 transmits an abort signal to CPU 124 to prevent execution of the selected set of NC part programs.

While CPU 124 is executing the selected one of a set of part programs, it generates control commands which are converted by I/O interface 140 into electrical signals supplied to machine and shuttle solenoids and to the machine limit switches. Motor drive commands generated by CPU 124 during part program execution are converted by an analog interface 142 into electrical signals supplied to one of appropriate motor drive amplifiers which control the machine motors that drive the spindle and machine table. Feedback information indicative of the angular position of machine tool spindle and table motors is provided to CPU 124 from a set of feedback devices 144a, 144b and 144c, which are coupled to CPU 124 by a feedback interface system 146. Typically, each of feedback device 144a, 144b and 144c is comprised of a resolver which is excited by analog interface 142 through feedback interface 146.

During machine control system operation, CPU 124 records information concerning machine tool parameters, such as cumulative cutting tool use, machine cycle time, and machine usage, to name a few. This information concerning machine parameters is transmitted, upon demand of SCCS 38, from CPU 124 through CMUX 126 to SCCS 38, which then displays this information to an operator.

Operation of flexible manufacturing system 10 will now be set forth by reference to FIGS. 6 and 7, which illustrate, in flow chart form, the software executed by SCCS 38, illustrated in FIG. 3, and by MHSC 22, illustrated in FIG. 4, respectively.

Figure 6:
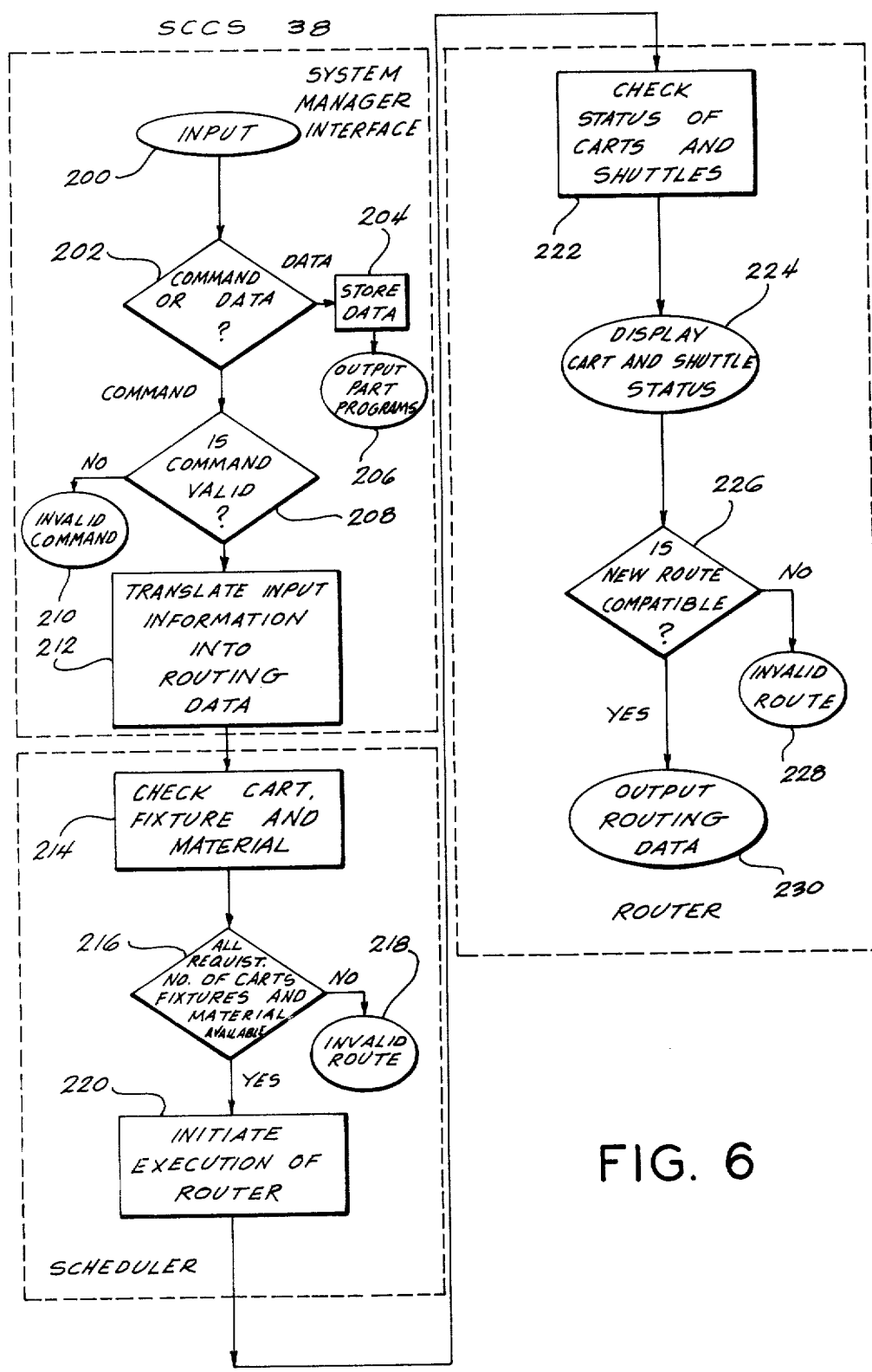
FIG. 6 is a flow chart diagram of a portion of the software executed by the supervisory control computer system of FIG. 3.

Referring to FIG. 6, at the outset of flexible manufacturing system operation, CPU 66 of SCCS 38 commences execution of the system manager interface (SMI) programs (STEP 200) by first receiving input data consisting of operator commands and data files which may contain routes, machine NC part programs and manual procedures, that is to say, machine tool requirements, machine cycle time requirements, as well as material inventory and production requirements, this input data being entered to CPU through one or more of terminals 80, 88 and 90, as well as tape drive 72, all illustrated in FIG. 3. Upon entry of the data files and commands, CPU 66 then ascertains whether the information inputted thereto is a data file or a command (STEP 202). If the input information is a data file it is then stored (STEP 204), typically on one of disks 68a and 68b, illustrated in FIG. 3, for retention within SCCS 38, or in the event that the input information is a set of machine NC part programs or program maps, for subsequent transmission (STEP 206) to each of machine control systems 30, illustrated in FIG. 5. Note, that if editing of one or more of the sets of machine NC part programs inputted to SCCS 38 is desired, then such editing is usually commenced at SCCS 38 prior to transmission of the NC part program to one of the machine control systems 30. Editing of machine NC part programs at SCCS 38 prior to the transmission thereof to the machine control system is advantageous as it insures uninterrupted NC part program execution by the machine control system in contrast to prior art interactive editing which required interruption of machine part program execution. If desired, an NC part program can also be edited at a machine even as the machine is running a different NC part program.

Should the input information to SCCS 38 be a command, then CPU 66 of SCCS 38 determines whether or not the entered command is valid (STEP 208), that is, whether or not the entered command is one of possible SCCS commands. If the command is invalid, then an invalid command message is displayed to the SCCS system operator (STEP 210). Valid SCCS commands encountered by the CPU 66 are then translated into production data (STEP 212), tooling data, program data report requests, as well as routing data, indicative of the desired path of materials which is then subsequently acted upon by the scheduler program.

Following the translation of input information into route information, CPU 66 then executes the scheduler program (SCHED), by first checking (STEP 214) the type, number and location of carts and fixtures, fixtures being those structures which hold one or more parts to a pallet, as well as the quantity of materials, that is, unfinished parts, available for machining. Once the status of carts, fixtures and materials is ascertained, CPU 66 then ascertains (STEP 216) whether the requisite number of carts, fixtures and materials are available for the desired routing path previously selected during execution of the SMI program. If the requisite number of carts, fixtures and materials are not available (STEP 218), then an invalid route message is displayed to the operator. When a sufficient number of carts, fixtures and materials are available for the new route, then CPU 66 initiates (STEP 220) execution of the desired route by commencing execution of the ROUTER program.

At the outset of execution of the ROUTER program, CPU 66 causes MHSC 22 to check transport system status (STEP 222), that is, CPU 66 commands MHSC 22 to determine the most recent location and status of each of the carts 20 and each of the shuttle assemblies 32, illustrated in FIG. 1. Thereafter, the present status of carts and shuttles is displayed (STEP 224) to allow the operator to enter any changes as may be necessary. Following the display of cart and shuttle status, CPU 66 then checks the new route against presently active routes to determine whether or not any conflicts may be present (STEP 226). If execution of the new route is likely to result in a conflict with any of the presently active routes, then an invalid route message is displayed to the operator (STEP 228), requiring selection of a new route. If the new route presents no conflict with presently active routes, then routing data, corresponding to the new route, is supplied to MHSC 22 (STEP 230) which, in response, initiates execution of the MHSC software.

Following an output of routing data to MHSC 22 of FIG. 4, CPU 102 of MHSC 22 commences execution of the programs TRAFFIC and OPERATIONS, which are each illustrated in flow chart form in FIG. 7. At the outset of TRAFFIC program execution by CPU 102, the memory of CPU 102 is updated (STEP 300), that is to say, the most recent location and status of carts 20 and shuttle assemblies 32 is entered in memory. Following updating of its memory, CPU 102 receives input routing data from SCCS 38 (STEP 302) and translates the routing data supplied from SCCS 38 into cart and shuttle commands (STEP 304) which, in turn, are transmitted by CPU 102 through multiplexer 104, illustrated in FIG. 4, to MHLP 96, illustrated in FIG. 4, which controls the movement of carts 20 and shuttle assemblies 32, both illustrated in FIG. 1, accordingly. After cart and shuttle commands are supplied by CPU 102 to MHLP 96, CPU 102 waits until MHLP 96 has completed (STEP 306) execution of the cart and shuttle commands prior to input of such commands to the OPERATION program (STEP 308).

The OPERATIONS program is active continuously and monitors the status of the shuttle assembly 32 on each machine tool. Following translation of cart and shuttle command, cart and shuttle status is determined (STEP 310). Next, as a part carrying pallet is shuttled from a cart to the machine table, the pallet reader reads the code on the pallet and the pallet reader data is then transmitted to CPU 102, illustrated in FIG. 4 (STEP 312). CPU 102 then determines whether or not the pallet on the machine table, as determined from the pallet code read by the pallet reader, corresponds to the pallet which was actually delivered, as determined from routing data supplied to CPU 102 by SCCS 38 (STEP 314). Since each machine control system 30, illustrated in FIG. 5, selects the set of NC part programs it executes, in accordance with the part program map, from the pallet code data produced by the pallet reader it is necessary to verify the identity of the pallet on the machine since the pallet reader does not always correctly read the pallet code. If the pallet code of the pallet on the machine table, as determined by the pallet reader, corresponds to the code of the pallet actually delivered to the machine, then CPU 102 transmits a confirm signal to machine control system 30 (STEP 316) which then initiates execution of a selected set of machine NC part programs corresponding to the pallet code read by the pallet reader in accordance with the program map (STEP 318). Otherwise, if the pallet code does not correspond, then CPU 102 sends an abort signal (STEP 320), inhibiting machine control system 30 from initiating part program execution. In this way, execution of an improper set of part programs is prevented, thereby avoiding damage to N/C machine tool 28, illustrated in FIG. 1. Actual listings of the SMI, ROUTER, TRAFFIC AND OPERATIONS programs written in RSX-11X MACRO assembler language for execution on a Digital Equipment Series 11 processor are found in microfiche appendix associated with this application. It should be noted that the OPERATIONS program described above is identified in the microfiche appendix by the header "station" whereas the program listing in the microfiche appendix which bears the header "operations" comprises a sub program of the ROUTER program for checking the validity of the then existing routes.

Two additional programs SMI (STEP 322) and ROUTER (STEP 324), identical to the SMI and ROUTER programs, respectively, described with respect to FIG. 6, are also resident in MHSC 22. During intervals, when SCCS 38 is inoperative, the MHSC resident SMI and ROUTER programs are executed by CPU 102 prior to execution of the TRAFFIC program. Input routing data, formerly provided by SCCS 38, is now supplied to CPU 102 by an operator through control data entry and display unit 100, illustrated in FIG. 4, or remote data entry and display unit 43, illustrated in FIG. 1, or in accordance with operator entered routing data previously stored on disk drive 110, illustrated in FIG. 4. This mode of flexible manufacturing system operation, characterized as the semi-automatic operating mode, allows continued production of machined parts under operator control despite the fact SCCS is inoperative. As previously indicated, manual operation of the flexible manufacturing system can readily be accomplished by entering shuttle and cart commands directly to MHLP 96 from control data entry and display unit 100 or remote data entry and display unit 43, and by entering machine tool commands entered directly to machine control system 30 by an operator.

The foregoing describes an improved flexible manufacturing system having distributed data processing capability which allows semi-automatic and manual operation during intervals when one of the data processing systems is inoperative. By employing distributed data processing, the flexible manufacturing system of the present invention is capable of controlling an infinite number of machine tools.

While only certain preferred features of the invention have been shown by way of illustration, many modifications and changes will occur to those skilled in the art. It is therefore to be understood that the appended claims are intended to cover all such modifications and changes as fall within the true spirit of the invention.

The principles of this invention having now been fully explained in connection with the foregoing, we hereby claim as our invention:

1. A flexible manufacturing system capable of automated production of machined parts comprising a plurality of computer numerically controlled machining centers which are each provided with a plurality of sets of machine NC part programs and a program map, each said computer numerically controlled machining center executing a selected one of said sets of machine NC part programs in accordance with said program map in response to machine tool commands and, in the absence of machine tool commands, in response to operator entered machine commands; a transport system having at least one load/unload station where unfinished parts are entered and finished parts are discharged, said transport system moving parts from each said load/unload station to said computer numerically controlled machining centers in accordance with electrical signals supplied to said transport system and said transport system generating data indicative of the part location during part movement; at least one data entry and display unit located in proximity with a respective one of said load/unload stations for transmitting data entered thereto by an operator indicative of the part type entered at said respective one of said load/unload stations; a supervisory control computer system coupled to each of said computer numerically controlled machining centers for supplying each said computer numerically controlled machining center with said selected sets of machine NC part programs and said program map, and said supervisory control computer system coupled to each said data entry and display unit for processing data therefrom to generate routing data indicative of the desired path of parts from said load/unload station to said computer numerically controlled machining centers; and a material handling system controller coupled to said supervisory control computer system to receive said routing data therefrom, said material handling system controller being coupled to said transport system for supplying said transport system with said electrical signals to cause movement of parts in accordance with said routing data, and in the absence of said routing data, in accordance with manually entered routing data and manually entered transport system commands, said material handling system coupled to each said computer numerically controlled machining center, and in accordance with said data generated by said transport system indicative of part location, said material handling system controller supplying said machine tool commands to said numerically controlled machining centers.

2. The invention according to claim 1, wherein said supervisory control computer system comprises input/output means for receiving input data, supervisory control computer system instructions and sets of machine NC part programs and program maps entered thereto by an operator and for displaying information indicative of system status; memory means for retaining said input data, said supervisory control computer system instructions and said machine part programs and program maps for retaining data transmitted thereto indicative of system status; electronic processing means coupled to said input/output means and to said memory means to receive said input data, said supervisory control computer system instructions and said sets of machine NC part programs and program maps therefrom, said electronic processing means executing said supervisory control computer system instructions, and in accordance with said electronic logic means transmitting said sets of machine NC part programs and program maps to said computer numerically controlled machining centers and said electronic processing means processing said input data together with said data from said data entry and display units to produce said routing data and said data indicative of system conditions which is transmitted to said memory means and said input/output means.

3. The invention according to claim 2 wherein said electronic processing means comprises a central processing unit and a multiplexer for coupling said central processing unit to said input/output means, to said material handling system controller, and to said plurality computer numerically controlled machining centers.

4. The invention according to claim 3, further including first means coupled between said multiplexer and said material handling system controller for reducing the degradation of signals transmitted therebetween; second means coupled between said multiplexer and each of said computer numerically controlled machining systems for reducing the degradation of signals transmitted therebetween; third means coupled between said multiplexer means and said data entry and display unit for reducing the degradation of signals transmitted therebetween.

5. The invention according to claim 1, wherein said material handling system controller comprises a control data entry and display unit for transmitting said manually entered routing commands and said manually entered transport system commands; a traffic control processor coupled to said supervisory control computer system and to said control data entry and display unit, said traffic control processor translating said routing data generated by said supervisory control computer system into transport system commands, and in the absence of said routing data, said traffic control processor translating manually entered routing commands into said transport system commands; and a material handling logic processor coupled to said traffic control processor, said control data entry and display unit and to said transport system, said material handling logic processor supplying said transport system with said electrical signals in accordance with said transport system commands supplied by said traffic control processor, and in the absence of said transport system commands, in accordance with said manually entered transport system commands transmitted thereto from said control data entry and display unit.

6. The invention according to claim 5, further including a remote unit coupled to said traffic control processor and said material handling logic processor for transmitting said manually entered routing data to said traffic control processor and for transmitting said manually entered transport system commands to said material handling logic processor.

7. The invention according to claim 5, further including storage means coupled to said traffic control processor for storing manually entered routing data and manually entered transport system commands and for transmitting said stored manually entered routing data and said stored manually entered transport commands to said traffic control processor.

8. The invention according to claim 5, wherein said traffic control processor comprises memory means containing a set of program instructions for translating said routing data into said transport system commands and for translating said manually entered routing commands into said transport system commands; and electronic processing means coupled to said supervisory control computer system to receive said routing data therefrom, and coupled to said control data entry and display unit to receive said manually entered routing data therefrom, said electronic processing means coupled to said memory means and to said material handling logic processor for executing said set of program instructions to supply said material handling logic processor with said transport system commands in accordance with said routing data received from said supervisory control computer system; and in the absence of said routing data, in accordance with said manually entered routing commands from said control set.

9. The invention according to claim 8, wherein said electronic processing means comprises a central processing unit for executing said set of program instructions stored at said memory means; a multiplexer for coupling said central processing unit to said material handling logic processor and to said control data entry and display unit; and an input/output port for coupling said multiplexer to said supervisory control computer system.

10. The invention according to claim 5, wherein said material handling logic processor comprises a communications multiplexer coupled to said control data entry and display unit and said traffic control processor for multiplexing said transport system commands and said manually entered transport system commands; a central processing unit coupled to said communications multiplexer for translating said transport system commands from said traffic control processor into said electrical signals for controlling said transport system, and in the absence of said transport system commands, said central processing unit translates said manually entered transport system commands into said electrical signals to control said transport system; and an interface for coupling said central processing means to said transport system.

11. The invention according to claim 1, wherein said transport system includes a track juxtaposed to each of said computer numerically controlled machine tools and said load/unload stations; a plurality of carts movable along said track for parts from said load/unload station to said computer numerically controlled machining centers; means disposed in said track for moving said carts along said track in accordance with said electrical signals; and a plurality of shuttle assemblies with at least one of said shuttle assemblies situated between said track and a respective one of said computer numerically controlled machining centers for shuttling a part from a predetermined one of said carts to a corresponding one of said machines in accordance with said electrical signals.

12. The invention according to claim 1, wherein each of said computer numerically controlled machining centers comprises a numerically controlled machine tool; and a machine control system coupled to said numerically controlled machine, said machine control system coupled to said supervisory control computer system to receive said plurality of sets of machine NC part programs and said program map therefrom, said machine control system coupled to said material handling system controller for receiving machine tool commands therefrom and for executing a selected one of sets of machine NC part programs in accordance with said program map responsive to machine tool commands, and in the absence of said machine tool commands, responsive to operator entered commands.

13. The invention according to claim 12, wherein said machine control system comprises input/output means for receiving said operator entered machine commands and for displaying data indicative of machine tool operator; memory means for storing said selected sets of machine NC part programs and said program map transmitted from said supervisory control computer system; a central processing unit for executing said selected one of said set of machine NC part programs in accordance with said program map in response to said machine tool commands, and in the absence of machine tool commands, in response to said operator entered commands, to direct the operation of said machine tool in accordance with machine tool feedback data; a communications multiplexer for coupling said central processing unit to said supervisory control computer system, to said memory means, and to said input/output means; interface means for coupling said central processing units to said material handling system controller and to said machine; and a feedback system coupled to said machine tool said central processing unit for supplying said central processing system machine tool feedback data.

14. The invention according to claim 13, further including a diagnostic control system interface for coupling said central processing unit to a diagnostic communication system.

15. An improved flexible manufacturing system capable of automated production of machined parts comprising a plurality of computer numerically controlled machining centers which are each provided with a plurality of sets of machine NC part programs and program map, each said computer numerically controlled machining center executing a selected one of said sets of machine NC part programs in accordance with a program map in response to machine tool commands, and in the absence of said machine tool commands, in response to operator entered machine commands, and during execution of said selected one of said sets of machine NC part programs, each said computer numerically controlled machining center generating data indicative of machine tool operation including cumulative cutting tool usage; a transport system having at least one load/unload station where unfinished parts are entered thereto and are discharged therefrom, said transport system moving said parts between said load/unload station to said computer numerically controlled machining centers in accordance with electrical signals supplied to said transport system and said transport system generating data indicative of part location during part movement; at least one data entry and display unit located in physical proximity with an associated one of said transport system load/unload stations, said data entry and display unit transmitting data entered thereto by an operator indicative of the type of part entered at said associated load/unload station; a supervisory control computer system coupled to each said computer numerically controlled machining center for supplying each said computer numerically controlled machining center with said selected sets of machine NC part programs and said program map and for receiving said data from each said computer numerically controlled machining center indicative of machine tool operation, said supervisory control computer system being coupled to each said data entry and display unit and in accordance with data transmitted by each said data entry and display unit, said supervisory control computer system generating routing data indicative of the desired path of parts between said transport system load/unload stations and said machining centers; output means coupled to said supervisory control system for transmitting information indicative of cumulative machine tool use; and a material handling system controller coupled to said supervisory control computer system to receive said routing data therefrom, said material handling system controller coupled to said transport system for supplying said transport system with said electrical signals in accordance with said routing data, and in the absence of said routing data, in accordance with operator entered data, and said material handling system controller coupled to each of said computer numerically controlled machining centers for supplying said computer numerically controlled machining centers with machine tool commands in accordance with said data generated by said transport system indicative of part location during part movement.

16. The invention according to claim 15, wherein said output means comprises a printer.

17. In a manufacturing system: a plurality of machine tools, each of said machine tools having a computerized numerical control for regulating its operation; a separate memory associated with each of said machines and connected to store complete part programs and transmit such programs to the numerical control of its associated machine; means connected to transmit complete part programs to the individual memories of said machine tools for storage; a part program map in each of said computerized controls for recording the location of each of the part programs in the associated memory as the programs are stored in the memory; identifying means at the machine arranged to identify the workpiece as it arrives at the machine for the performance of a work operation; means being in the computerized numerical control responsive to the identification of the workpiece to refer to said part program map for determining the address of the required program in said memory; and means coupling the program at the determined address to said numerical control circuit for regulating the operation of the machine to produce the required operations on the workpiece at the machine.

* * * * *